United States Patent
Sun et al.

(10) Patent No.: US 12,056,853 B2
(45) Date of Patent: Aug. 6, 2024

(54) STENT VISUALIZATION ENHANCEMENT USING CASCADED SPATIAL TRANSFORMATION NETWORK

(71) Applicant: Shanghai United Imaging Intelligence Co., LTD., Shanghai (CN)

(72) Inventors: Shanhui Sun, Cambridge, MA (US); Li Chen, Cambridge, MA (US); Yikang Liu, Cambridge, MA (US); Xiao Chen, Cambridge, MA (US); Zhang Chen, Cambridge, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 439 days.

(21) Appl. No.: 17/565,714

(22) Filed: Dec. 30, 2021

(65) Prior Publication Data

US 2023/0214964 A1 Jul. 6, 2023

(51) Int. Cl.
*G06T 5/70* (2024.01)
*G06T 5/10* (2006.01)
*G06T 5/50* (2006.01)

(52) U.S. Cl.
CPC ............... *G06T 5/70* (2024.01); *G06T 5/10* (2013.01); *G06T 5/50* (2013.01); *G06T 2207/10121* (2013.01); *G06T 2207/20048* (2013.01); *G06T 2207/20084* (2013.01); *G06T 2207/30052* (2013.01)

(58) Field of Classification Search
None
See application file for complete search history.

(56) References Cited

U.S. PATENT DOCUMENTS

| | | |
|---|---|---|
| 8,433,115 B2 | 4/2013 | Chen et al. |
| 8,989,461 B2 | 3/2015 | Zhu et al. |
| 9,082,158 B2 | 7/2015 | Chen et al. |
| 10,467,786 B2 | 11/2019 | Ramus et al. |
| 2008/0125846 A1 | 5/2008 | Battle et al. |
| 2014/0079308 A1* | 3/2014 | Chen .................. G06T 5/50 382/132 |

(Continued)

OTHER PUBLICATIONS

Y. Lin, M. Wang, C. Gu, J. Qin, D. Bai and J. Li, "A Cascaded Spatial Transformer Network for Oriented Equipment Detection in Thermal Images," 2018 2nd IEEE Conference on Energy Internet and Energy System Integration (Ei2), Beijing, China, 2018, pp. 1-5, doi: 10.1109/EI2.2018.8582248 (Year: 2018).*

(Continued)

*Primary Examiner* — Vu Le
*Assistant Examiner* — Charles C L Penny
(74) *Attorney, Agent, or Firm* — Zhong Law LLC (57) ABSTRACT

An apparatus for stent visualization includes a hardware processor that is configured to input one or more stent images from a sequence of X-ray images and corresponding balloon marker location data to a cascaded spatial transform network. The background is separated from the one or more stent images using the cascaded spatial transform network and a transformed stent image with a clear background and a non-stent background image is generated. The stent layer and non-stent layer are generated using a neural network without online optimization. A mapping function f maps the inputs, the sequence images and marker coordinates, into the two single image outputs.

20 Claims, 10 Drawing Sheets

(56) References Cited

U.S. PATENT DOCUMENTS

2020/0222018 A1* 7/2020 van Walsum .......... A61B 6/463
2020/0337591 A1* 10/2020 Rotman ........... G01R 33/56509

OTHER PUBLICATIONS

J. Caballero et al., "Real-time video super-resolution with spatio-temporal networks and motion compensation," 2017 IEEE Conference on Computer Vision and Pattern Recognition (CVPR), Jul. 2017. doi: 10.1109/cvpr.2017.304 (Year: 2017).*
Jaderberg et al., Spatial Transformer Networks, Feb. 2016.

* cited by examiner

STENT VISUALIZATION ENHANCEMENT USING CASCADED SPATIAL TRANSFORMATION NETWORK

FIELD

The aspects of the disclosed embodiments relate generally to stent localization and placement, and more particularly to enhanced stent visualization during a stent placement procedure.

BACKGROUND

Stent placement is a usual practice to avoid arteries from being totally occluded. During the stent placement, stents are delivered to the occluded artery region through the catheter and then expanded using a balloon. Fluoroscopy images are used to help surgeons monitor the stent and balloon during a stent placement procedure.

While unique markers are typically placed on the balloon for easier stent localization, it can still be challenging to clearly visualize the stents. Motions, such as the heart beating, breathing and stent movements, will affect clear visualization of the stent in the fluoroscopy images or video. A clear enhancement of the stent images from the fluoroscopy video can be helpful in multiple ways, including for example, monitoring balloon dilation, identifying insufficient stent deployment or expansion, or observing stent fracture.

In traditional methods, N-fluoroscopy (or cine) images are aligned based on the detected balloon marks and the stent image is then achieved from the averaging the aligned images. In some scenarios, the balloon markers are detected, the stent motion is estimated, and based on the estimated stent motion, the stent layer and non-stent layer are separated utilizing an on-line optimization procedure. The stent layer is the final image presented to the surgeons. However, these methods for stent visualization typically require an on-line optimization iteratively until the stent layer result converges. During the on-line optimization, the motion of the non-stent layer is estimated, which is slow.

Accordingly, it would be desirable to provide apparatus and methods that address at least some of the problems described above.

SUMMARY

The aspects of the disclosed embodiments are directed to an apparatus for stent visualization enhancement. This and other advantages of the disclosed embodiments are provided substantially as shown in, and/or described in connection with, at least one of the figures, as set forth in the independent claims. Further advantageous modifications can be found in the dependent claims.

According to a first aspect, the disclosed embodiments provide an apparatus for stent visualization during a stent placement procedure. In one embodiment, the apparatus includes a processor that is configured to transform a first stent image to an image space using a first spatial transformer network (STN0) to generate a first transformed stent image; generate a new background image from the first transformed stent image; transform the new background image to a background image space using a second spatial transformer network (STN1) to generate a non-stent background image ($B^k$); transform the non-stent background image ($B^k$) to the image space using the second spatial transformer network (STN1); generate a stent image in the image space from the transformed non-stent background image; and transform the stent image in the image space to a stent image space to generate a clear stent image $S^k$ for the stent visualization. The aspects of the disclosed embodiments separate the stent layer and non-stent layer using a neural network without online optimization. Stent motion and non-stent motion are not estimated on-line in an explicit way.

In a possible implementation form the first stent image is an image from a sequence of image frames and the hardware processor is further configured to generate the clear stent image $S^k$ based on image frames in the sequence of image frames.

In a possible implementation form the hardware processor is further configured to use an average layer to generate the non-stent background image based on the transformed new background image from the second spatial transformer network (STN1) for the image frames in the sequence of image frames and use the average layer to generate the clear stent image based on the transformed stent image from the first spatial transformer network (STN0) for the image frames in the sequence of image frames. The aspects of the disclosed embodiments enable processing for all images in the sequence of images.

In a possible implementation form the hardware processor is further configured to generate the first transformed stent image using balloon marker positions as inputs to the first spatial transformer network (STN0).

In a possible implementation form the hardware processor is further configured to use a minus operation to generate the new background image from the first transformed stent image, wherein an input to the minus operation is a corresponding image from an image sequence.

In a possible implementation form a separated background image is used as an input to the second spatial transformer network to transform the new background image to the background image space.

In a possible implementation form a corresponding image from an image sequence is used as an input to the second spatial transformer network (STN1) to transform the non-stent background image ($B^k$) to the image space.

In a possible implementation form the hardware processor is configured to use a minus operation to generate the stent image in the image space from the transformed non-stent background image, wherein an input to the minus operation is a corresponding image from an image sequence.

In a possible implementation form the hardware processor is further configured to generate the clear stent image using balloon marker positions as inputs to the first spatial transformer network (STN0).

In a possible implementation form the first spatial transformer network and the second spatial transformer network form a cascaded spatial transformer network.

According to a second aspect the disclosed embodiments provide a network for stent visualization enhancement. In one embodiment, the network includes at least two spatial transform networks. One spatial transform network is used to transform images based on computed affine transform from corresponding points.

The other spatial transform network is used to align one image to another image.

According to a third aspect, the disclosed embodiments are directed to a method in a neural network. In one embodiment, in a first operation, a stent image is fed to a first spatial transform network given corresponding balloon markers as other inputs. The result is fed to a minus operator. Another input of the minus operator is a corresponding image from the image sequence. The result of the minus operator is fed to a second spatial transform network given a separated background image as input. These frames are repeated for all available frames and then results are fed to average layer to generate a non-stent background image.

In a possible implementation form, in a second operation, the result from prior average layer, the non-stent background image, is then fed to the second spatial transform network with the corresponding frame image as another input. The result is then fed to the minus layer with the corresponding frame image as another input. The result is then fed to the first spatial transform network with the balloon markers as other inputs. These steps are repeated for all available frames and the results fed to the average layer. The result is the stent image.

According to a fourth aspect the disclosed embodiments provide a method for stent visualization enhancement during a stent placement procedure. In one embodiment, the method includes using a hardware processor to generate a clear stent image and a non-stent background image from image frames of a sequence of image frames. The method further includes the hardware processor being further configured to transform a first stent image of the sequence of image frames to an image space of the sequence of image frames using a first spatial transformer network (STN0) to generate a first transformed stent image; generate a new background image from the first transformed stent image; transform the new background image to a background image space using a second spatial transformer network (STN1) to generate a non-stent background image ($B^k$); transform the non-stent background image ($B^k$) to the image space of the sequence of image frames using the second spatial transformer network (STN1); generate a stent image in the image space of the sequence of image frames from the transformed non-stent background image; and transform the stent image in the image space to a stent image space to generate the clear stent image $S^k$. The process is repeated for all available image frames.

According to a fifth aspect the disclosed embodiments provide a computer program product with a non-transitory computer-readable medium having stored thereon, computer implemented instructions that when executed by a computer cause the computer to execute the methods and processes described herein.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

The following detailed description illustrates exemplary aspects of the disclosed embodiments and ways in which they can be implemented. Although some modes of carrying out the aspects of the disclosed embodiments have been disclosed, those skilled in the art would recognize that other embodiments for carrying out or practising the aspects of the disclosed embodiments are also possible.

Figure 1:
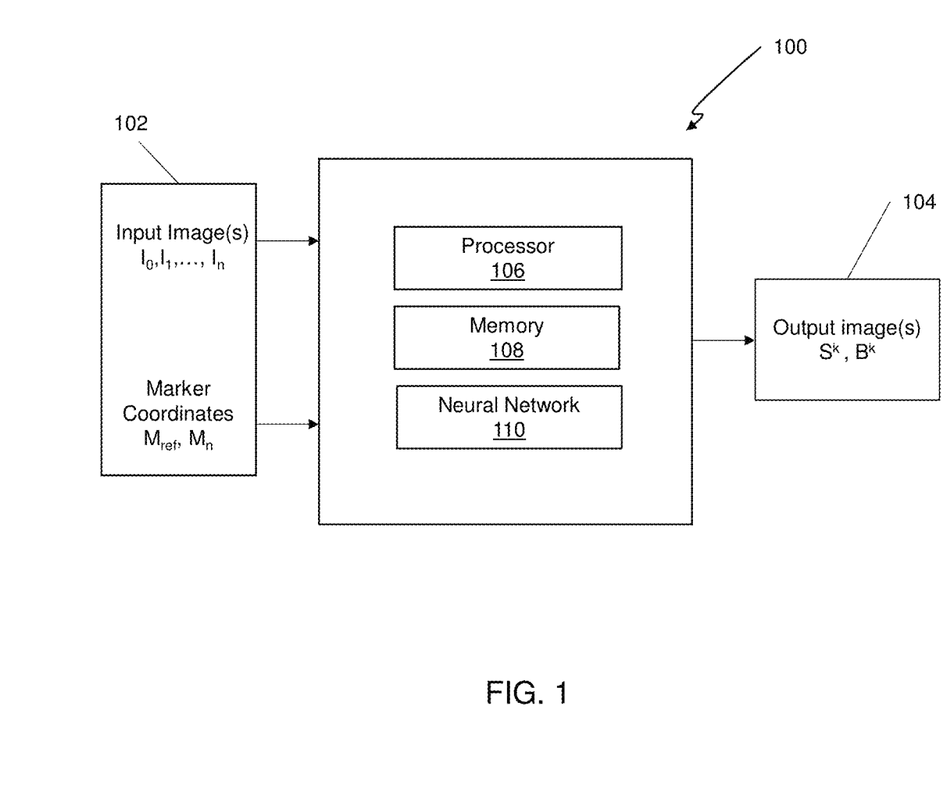
FIG. 1 is a schematic block diagram an exemplary apparatus incorporating aspects of the disclosed embodiments.

FIG. 1 is a schematic block diagram of an exemplary apparatus 100 for enhanced stent visualization in accordance with the aspects of the disclosed embodiments. The aspects of the disclosed embodiments are generally directed to providing clear stent image visualization using a cascaded spatial transformation or transformer network that is configured to iteratively generate a stent image $S^k$ and a non-stent background image $B^k$, where k indicates the number of cascaded networks. According to the aspects of the disclosed embodiments a mapping function f is configured to map the inputs 102, namely the input X-ray images $I_n$ and the marker coordinates $M_{ref}$, $M_n$, into an output 104, namely the stent image $S^k$ and non-stent background image $B^k$. In one embodiment, the function f is realized by a neural network, such as the neural network 110 illustrated in FIG. 1.

As illustrated in the example of FIG. 1, the output 104 of the apparatus 100 generally comprises two single images, the stent image $S^k$ and the non-stent background image $B^k$. The stent image $S^k$ is the enhanced image of the stent against a clear background, free of anatomies such as the ribs and lungs, for example. The non-stent background image $B^k$ does not include the stent. As will be generally understood, there are many motions associated with the X-ray images $I_n$, stent images $S^k$, and background images $B^k$. These motions can include, but are not limited to cardiac motion, breathing motion, rib cage movement and lung movement. Generally, the stent can move with any one or more of these motions. The aspects of the disclosed embodiments are configured to separate these motions from the generated stent images $S^k$ and the non-stent background images $B^k$.

Figure 2A:
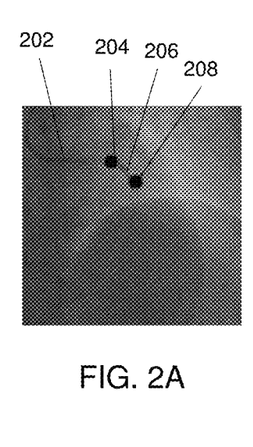
FIGS. 2A-2C illustrate exemplary input images for the apparatus of the disclosed embodiments.
Figure 2B:
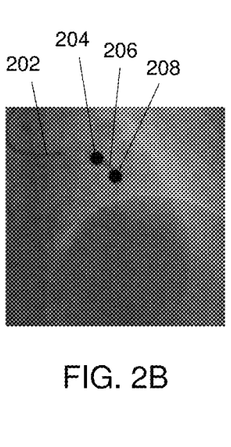
Figure 2C:
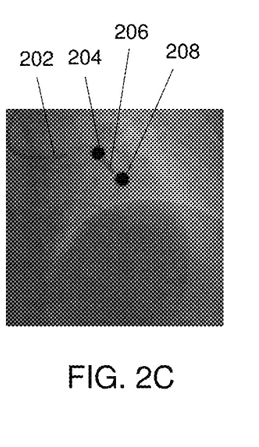

As shown in FIG. 1, the input 102 includes the image sequence $I_0, I_1, \ldots I_n$, where $I_n$ is a frame image. In the example of FIG. 1, the images in the image sequence $I_0, I_1, \ldots I_n$ are X-ray images. FIGS. 2A-2C illustrate examples of X-ray image acquisition at different time points. While in this example only three images are illustrated, the aspects of the disclosed embodiments are not so limited. In alternate embodiments, any suitable number of frame images can be used for the image input sequence $I_0, I_1, \ldots I_n$, other than including three.

The exemplary frame images of FIGS. 2A-2C include the catheter, which in one embodiment is an artery, together with the balloon markers 204, 208 associated with the stent 206. In this example, the balloon markers 204, 208 are represented as black dots for ease of visualization. It will be understood that in a traditional image sequence, the balloon markers 204, 208 might be represented as white spaces, dots or circles.

Figure 3A:
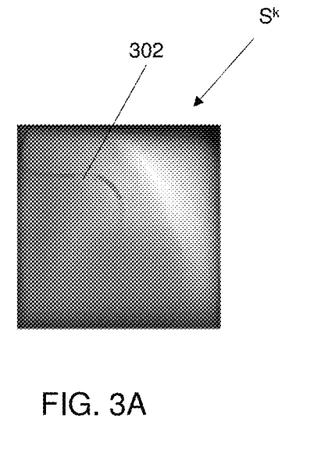
FIG. 3A illustrates one example of a stent image produced by the apparatus of the disclosed embodiments.

One example of a clear stent image $S^k$ is illustrated in FIG. 3A. The term "stent image", as used herein is generally a single image utilized for visualization. The stent image $S^k$ is typically the image that the medical practitioner, or physician, wishes to see during the fluoroscopy or stent placement procedure. In FIG. 3A, the stent 302 is shown against a white background for ease of visualization. Other anatomical structures of the original input image $I_n$ are removed.

Figure 3B:
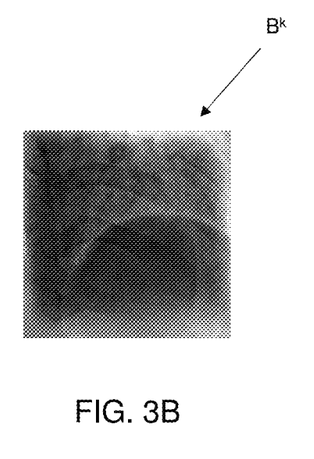
FIG. 3B illustrates one example of a non-stent background image produced by the apparatus of the disclosed embodiment.

The term "background image" is a single image that does not include the stent. An example of a non-stent background image $B^k$ is shown in FIG. 3B.

Figure 4:
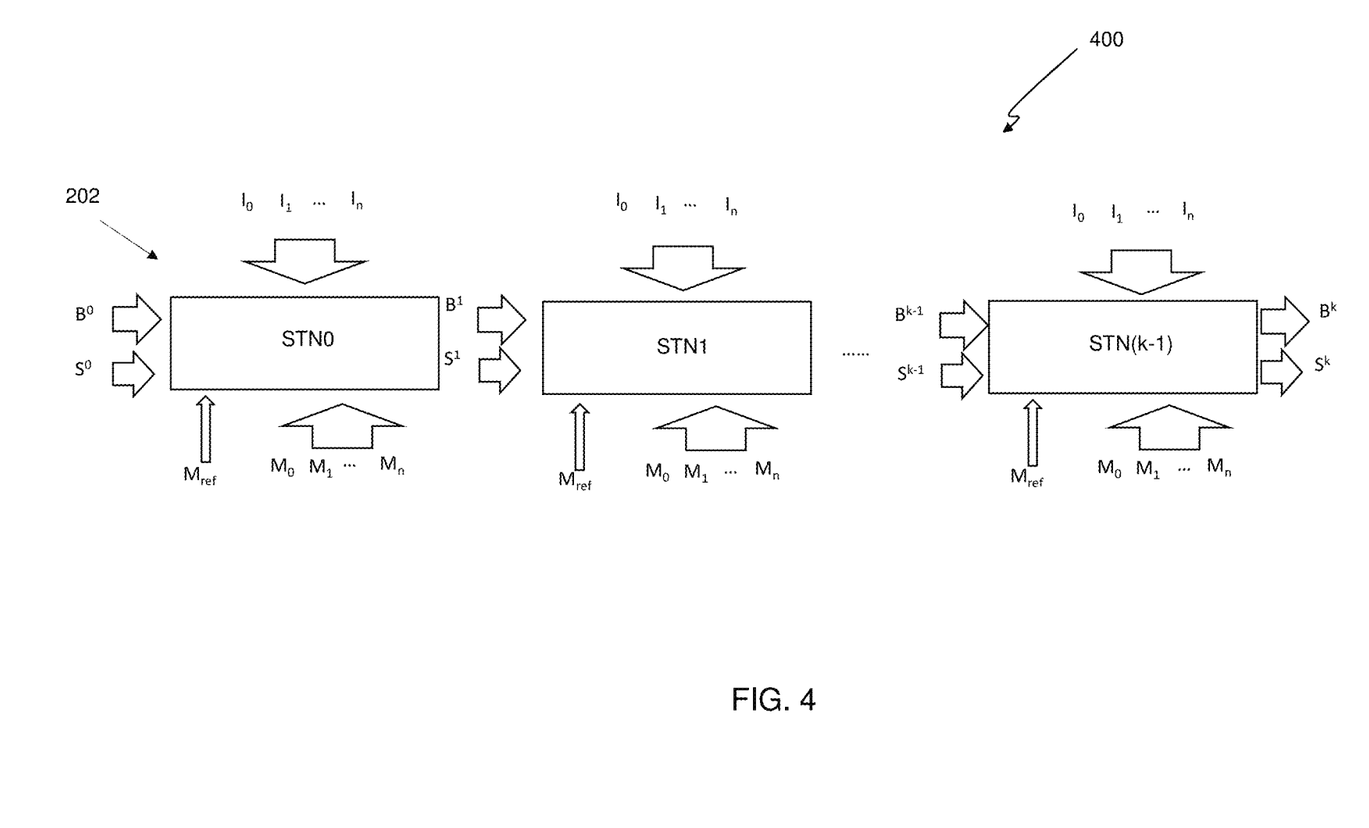
FIG. 4 is a schematic block diagram of an exemplary network structure for an apparatus incorporating aspects of the disclosed embodiments.

FIG. 4 illustrates one example of a cascaded network structure 400 incorporating aspects of the disclosed embodiments. In the example of FIG. 4, cascaded spatial transformer networks STN0, STN1 ... STN(k-1) are configured to predict $S^k$ and $B^k$, where k is at least one. The inputs to the spatial transformer networks STN0 and STN1 include the two balloon marker coordinates $M_n$, where n is the image frame index, and a balloon marker fixed frame index $M_{ref}$, which is selected from $\{0, 1, \ldots, N-1\}$. The spatial transformer networks STN0, STN1 ... STN(k-1) can be different network structures, the same network structure with different weights or the same network structure with the same weights.

Three major coordinate systems are relied on. These include a coordinate system for each X-ray image $I_n$ in the X-ray image sequence $I_0$-$I_n$, a coordinate system for the stent images $S^k$, and a coordinate system for the background images $B^k$. According to the aspects of the disclosed embodiments, in the example of FIG. 4, the first spatial transformation network STN0 is configured to transform images between the coordinate system of the stent image $S^k$ and the coordinate system of the X-ray image $I_n$. The second spatial transformation network STN1 is used to transform images between the coordinate system of the background image $B^k$ and the coordinate system of the X-ray image $I_n$.

In the exemplary cascaded network structure 400 illustrated in FIG. 4, the spatial transformation network STN0 and spatial transformation network STN1 are used twice. The first spatial transform network STN0 is configured to transform the images based on computed affine transformation from corresponding points. The second spatial transform network STN1 is used to align one image with another. As will be described further with respect to FIG. 5, the network 400 can also include minus layers or operations and average layers or operations.

Figure 5:
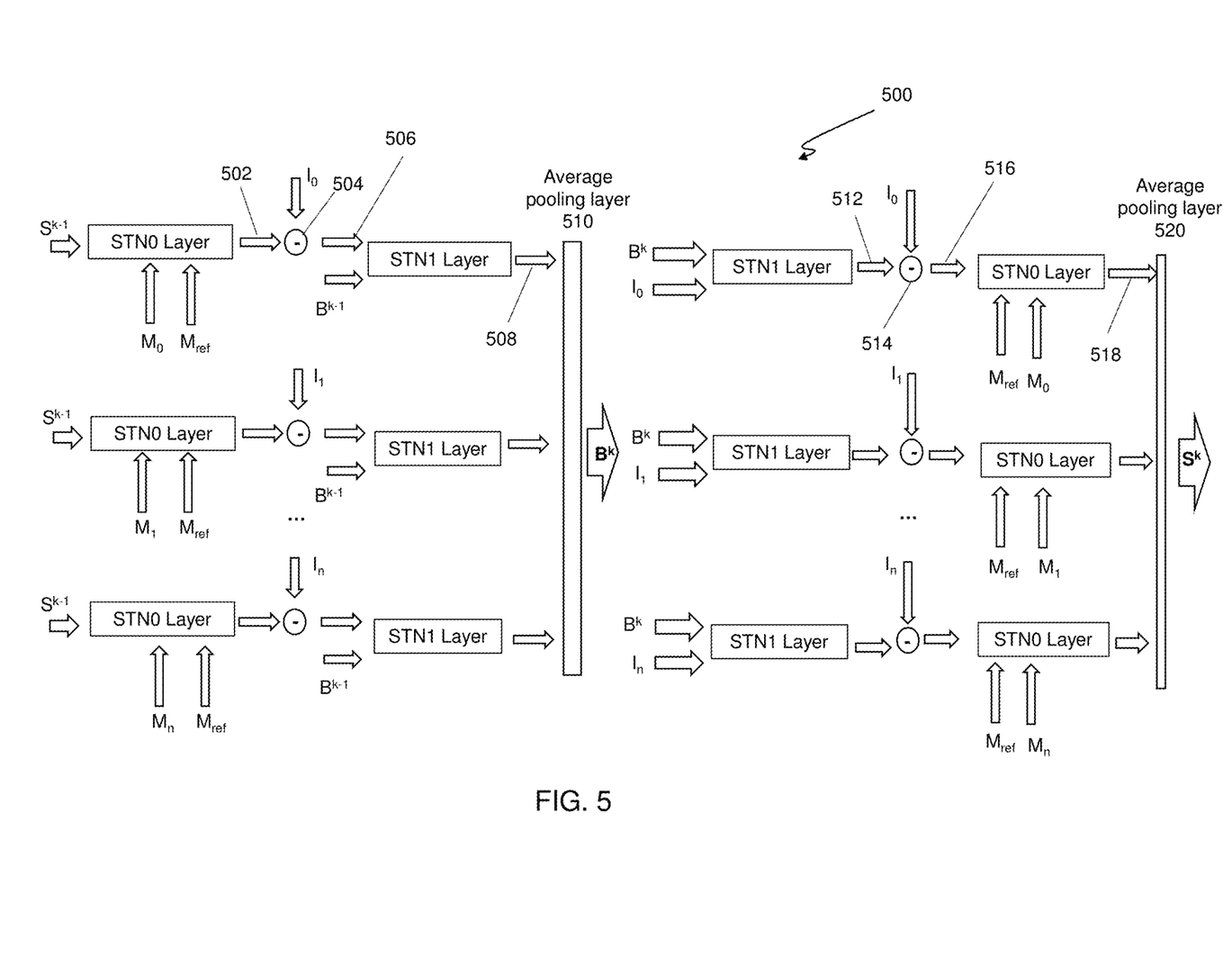
FIG. 5 is a schematic block diagram of an exemplary network structure for an apparatus incorporating aspects of the disclosed embodiments.

FIG. 5 illustrates an exemplary network architecture 500 for separating the stent image $S^k$ and the background image $B^k$ at the iteration k in accordance with the aspects of the disclosed embodiments. The network structure 500 generally comprises four sub-networks. These sub-networks include a first spatial transformation network or layer STN0, a second spatial transformation network or layer STN1, a minus operation layer 504, 514 and an average pooling layer 510, 520. Although the minus operation layer 504, 514 and the average pooling layer 510, 520 are shown in the example of FIG. 5 as comprising two different network structures, the aspects of the disclosed embodiments are not so limited. In alternate embodiments, the minus operation layers 504, 514 and the average pooling layers 510, 520 can each comprise single network structures.

As is illustrated in FIG. 5, the stent image $S^{k-1}$, marker position $M_1$ and marker reference position $M_{ref}$ are the inputs to the first spatial transformer network STN0. The different layers of the first spatial transformer network STN0 shown in FIG. 5 are configured to transform a stent image $S^{k-1}$ to the coordinate system of original image $I_n$, one by one in the X-Ray sequence $I_0, I_1 \ldots I_n$. This transformation results in an "aligned image", generally meaning that the stent image $S^{k-1}$ is aligned or mapped with the coordinate system of the original X-ray image $I_n$.

This aligned image or result 502 of the first spatial transformer layer STN0 is used to find a new non-stent background image $B^k$. In the example of FIG. 5, for the illustrated iteration, the result 502 of the first spatial transformer network STN0, together with image frame $I_1$ are processed in a minus operation 504. This result 506, or the output of the minus operation 504, is a new non-stent background image.

The second spatial transformer network STN1 then is used to transform the new non-stent background image 506, which is still in the coordinate system of the original X-ray image, also referred to as the "original image space" to the coordinate system of the prior non-stent background image $B^{k-1}$. The result 506 of the minus operation 504 and the non-stent background image $B^{k-1}$ are the inputs to the second spatial transformer network STN1.

The result 508 of the second spatial transformer network STN1 in this example is a new non-stent background image $B^k$. As shown in FIG. 5, the new background image $B^k$ is based on the average pooling layer 510.

The spatial transformer network STN1 is then used a second time. Following the average pooling layer 510, the order of the first transformer network STN0 and second transformer network STN1 is reversed. In this example, the new non-stent background image $B^k$, which is a single image, is transformed by the spatial transformer network STN1 back to the coordinate system of the original image space, namely image $I_n$.

The result 512 the second spatial transformer network STN1 is a new non-stent background image transformed to the coordinate system of the original image space $I_n$. In this example, the result 512 of the second spatial transformer network STN1 and the image frame $J_0$ is processed in the minus layer or operation 514. This result 516 is a stent image.

The first spatial transformer network STN0 is then used a second time to transform the stent image 516 from Xray image space to the stent image space. In this example, the result 516, together with the balloon marker fixed frame index $M_{ref}$ and the two balloon marker positions $M_0$, are the inputs to the first spatial transformer network STN0.

The result 518 of the first spatial transformation network STN0 in this example is processed by an average layer 520. The output of the average pooling layer 520 is the stent image $S^k$.

In one embodiment, when k=1, the non-stent background image $B^0$ can be initialized as a black image, which contains zero in the image. The stent image $S^0$ can be initialized as one of the images in the image sequence $I_0$ to $I_n$.

For example, in one embodiment, the stent image $S^0$ can be the first image $I_0$ in the image sequence $I_0 \ldots I_n$. During the inference stage, the inputs can be fed directly into the network structure 500. The stent image $S^k$ is then obtained for better visualization.

The aspects of the disclosed embodiments are not limited to a specific network structure. The image order in the sequence illustrated in FIG. 5 is merely exemplary. In alternate embodiments, any suitable image order sequence can be used. The vertical operations illustrated in FIG. 5 do not depend upon the image order. In addition, the image number n and the cascade number k can be variables.

Figure 6:
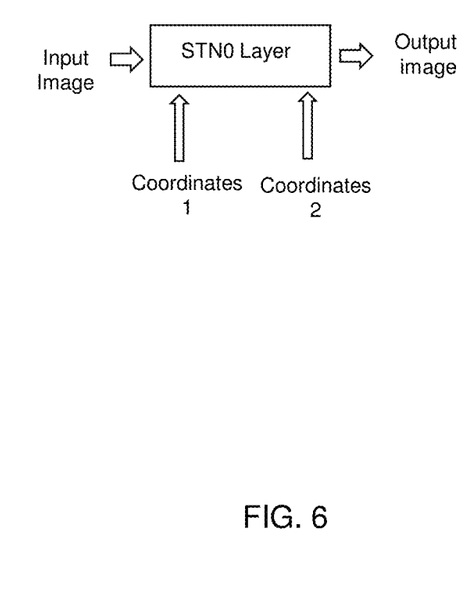
FIG. 6 is a schematic block diagram of an exemplary spatial transformer network structure incorporating aspects of the disclosed embodiments.

FIG. 6 illustrates one example of a first spatial transformer network STN0 incorporating aspects of the disclosed embodiments. The first spatial transformer network STN0 is used to transform an input image from Spatial Coordinates 2 to Spatial Coordinates 1. For example, as shown in FIG. 5, in the first use of the spatial transformation network STN0, the Spatial Coordinates 1 are $M_n$, the two balloon marker locations, while Spatial Coordinates 2 is $M_{ref}$, the balloon marker fixed frame index. In the second use of the spatial transformation network STN0, the Spatial Coordinates 1 are $M_{ref}$, while Spatial Coordinates 2 is $M_1$.

Figure 7:
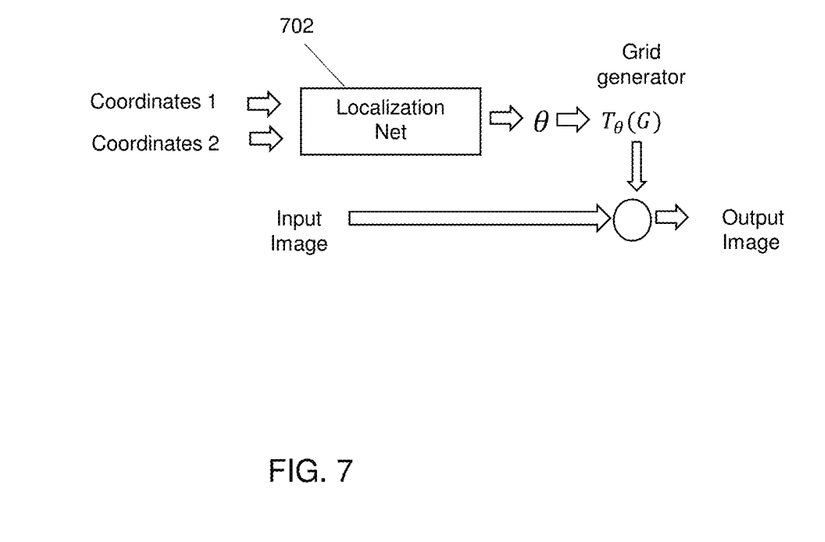
FIG. 7 illustrates one embodiment of an internal structure of the exemplary spatial transformer network of FIG. 6.

FIG. 7 illustrates an exemplary internal structure of the first spatial transformer network STN0. In this example, the localization net 702 predicts the affine transformation θ from Spatial Coordinates 2 and Spatial Coordinates 1. The localization net 702 can be any suitable affine transformation estimator. In one embodiment, the localization net 702 is a neural network. Training samples can be established and the network can be trained using supervised learning. In one embodiment, the neural network is a fully connected network. The grid generator shown in FIG. 7 is used to re-sample the input image based on the predicted affine transformation parameters.

Figure 8:
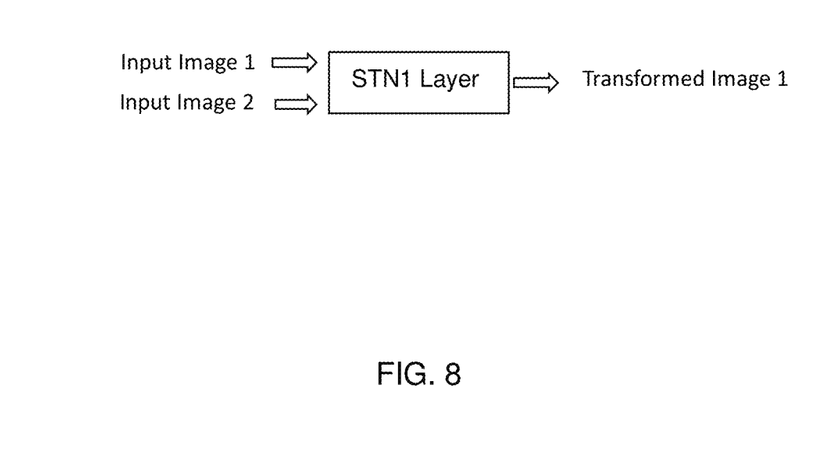
FIG. 8 is a schematic block diagram of an exemplary spatial transformer network incorporating aspects of the disclosed embodiments.

FIG. 8 illustrates one example of the second spatial transformer network STN1. As shown in this example, the second spatial transformer network STN1 is used to align input image 1 to the coordinate system of input image 2, resulting in a new, or Transformed Image 1. Referring again to the example of FIG. 5, in the first use of the second spatial transformer network STN1, the STN1 aligns the non-stent background image 506 with the coordinate system of the non-stent background image $B^{k-1}$. In the second use, the non-stent background image $B^k$ is aligned with the coordinate system of the original image frame $I_n$.

Figure 9:
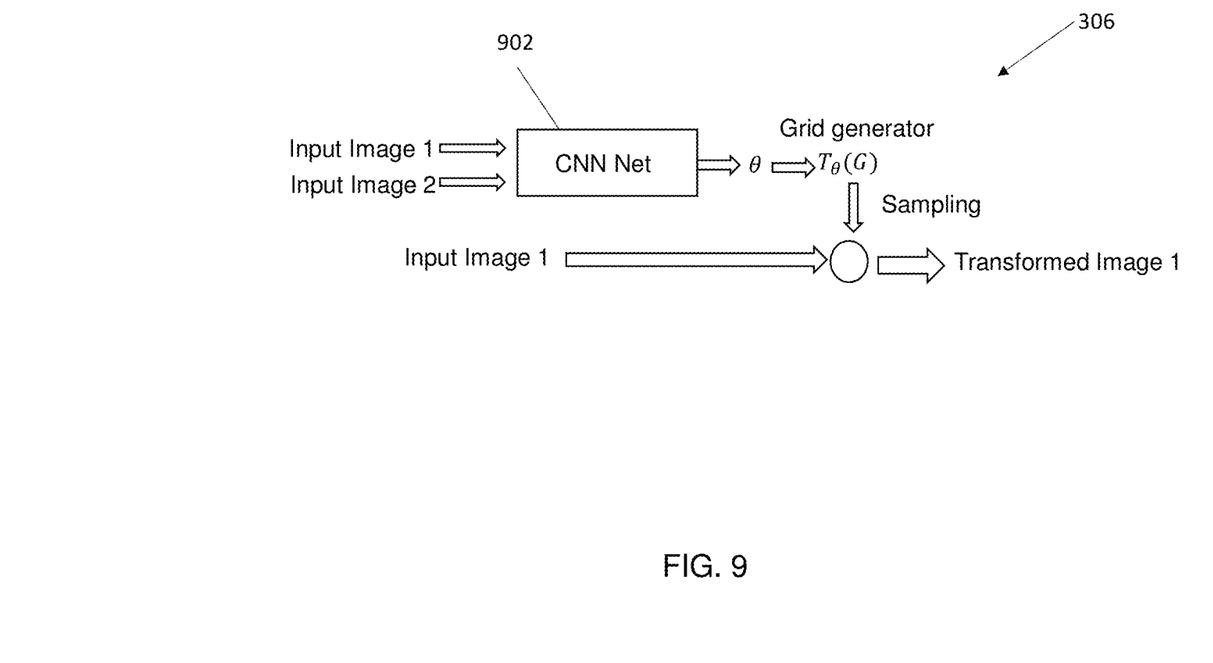
FIG. 9 illustrates one embodiment of an internal structure of the exemplary spatial transformer network of FIG. 6.

FIG. 9 illustrates one example of the second spatial transformer network STN1 using a spatial transformer network structure. In this example, the convolutional neural network (CNN) 902 is followed by a grid generator for resampling Input Image 1. This results in a new, or Transformed Image 1, which is aligned with the coordinates of Input Image 2.

In one embodiment, the first spatial transformer network STN0 and the second spatial transformer network STN1 can be trained separately. For the second spatial transformer network STN1, the network can be trained using supervised learning or unsupervised learning. For unsupervised learning, the loss is based on comparing the transformed Image 1 with Input Image 2. For supervised learning, the ground truth of the transformed Image 1 is needed, which can be generated from any suitable image registration algorithm.

Figure 10:
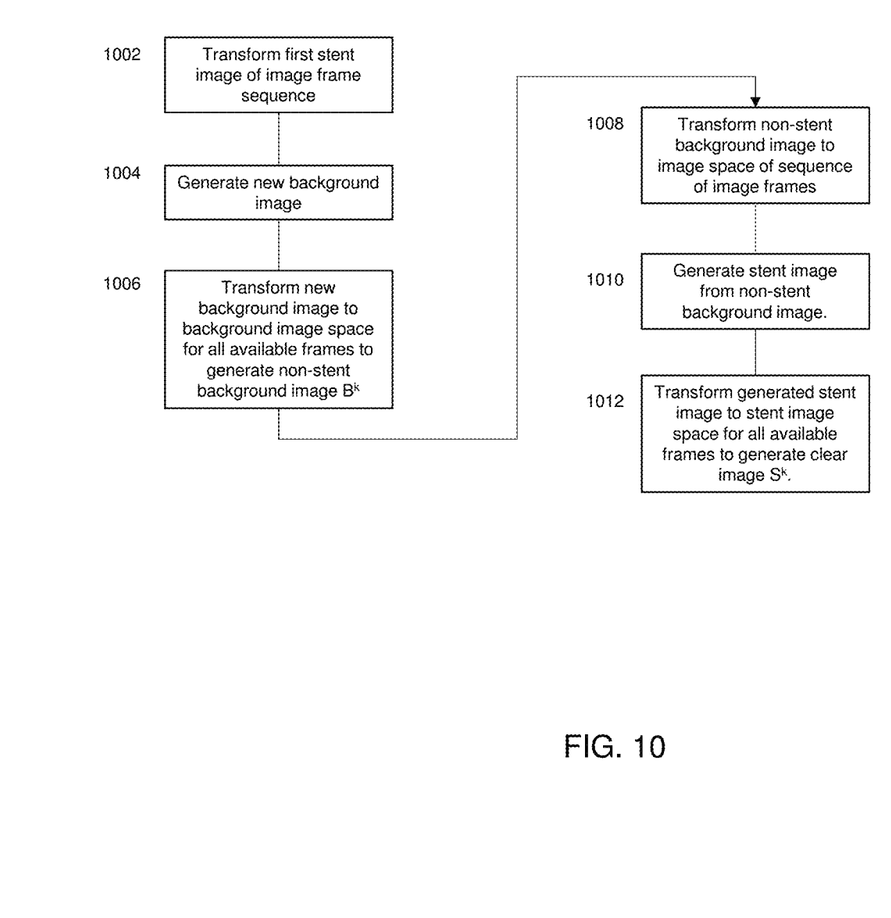
FIG. 10 is a flowchart of an exemplary method incorporating aspects of the disclosed embodiments.

FIG. 10 illustrates one embodiment of a process incorporating aspects of the disclosed embodiments. As shown in FIG. 10, the process or computer implemented method includes using a hardware processor to generate a clear stent image and a non-stent background image from image frames of a sequence of image frames. In one embodiment a first stent image of the sequence of image frames is transformed 1002 to an image space of the sequence of image frames using a first spatial transformer network (STN0) to generate a first transformed stent image. In one embodiment, corresponding balloon marker positions are used as inputs to the first spatial transformer network.

A new background image is generated 1004 from the first transformed stent image. In one embodiment, a minus operation is used with a corresponding image frame from the sequence of image frame as an input to the minus operation.

The new background image is transformed 1006 to a background image space using a second spatial transformer network (STN1) to generate a non-stent background image ($B^k$). In one embodiment, a separated background image is an input to the second spatial transformer network (STN1). In one embodiment, these frames are repeated for all available frames and the results processed in an average layer to generate the non-stent background image.

The non-stent background image (Bk) is transformed 1008 to the image space of the sequence of image frames using the second spatial transformer network (STN1). A corresponding frame image from the sequence of image frames is an input top the second spatial transformer network (STN1). In this example, the second spatial transformer network (STN1) is used twice.

A stent image is generated 1010 in the image space of the sequence of image frames from the transformed non-stent background image. In one embodiment, the minus operation is used, where the corresponding image frame from the sequence of image frames is an input to the minus operation.

The result of the minus operation is fed to the first spatial transformer network (STN0) where the generated stent image is transformed 1012 to the stent image space. In one embodiment, the balloon marker positions are an input to the first spatial transformer network. The steps are repeated for all available image frames and an average layer is used to generate the clear stent image Sk.

As illustrated in FIG. 1, the apparatus 100 includes at least a processor 106, a memory 108 and a neural network 110. The processor 106 is communicatively coupled to the memory 108 and the neural network 110. In one embodiment, the processor 106 is configured to acquire the X-ray image sequence ($I_0, I_1, \ldots, I_n$) and balloon marker location or position data $M_{ref}, M_n$ as inputs to the neural network 110.

The output of the neural network 110 is the clear stent image $S^k$ and the non-stent background image $B^k$. The function "f" is realized via the neural network 110 in conjunction with the operation of the processor 106.

The apparatus 100 includes suitable logic, circuitry, interfaces and/or code that is configured to carry out and execute the processes described herein. Examples of the apparatus 100 may include, but are not limited to, an application server, a web server, a database server, a file server, a cloud server, or a combination thereof.

The processor 106 includes suitable logic, circuitry, interfaces and/or code that is configured to process the plurality of images (or the sequence of image frames) by use of the neural network 110. The processor 106 is configured to respond to and process instructions that drive the apparatus 100. Examples of the processor 106 include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit. Optionally, the processor 106 may be one or more individual processors, processing devices and various elements associated with a processing device that may be shared by other processing devices. Additionally, the one or more individual processors, processing devices and elements are arranged in various architectures for responding to and processing the instructions that drive the apparatus 100. In one embodiment, the processor 106 is a hardware processor configured to execute machine readable instructions to carry out the processes generally described herein.

In one embodiment, the neural network 110 refers to an artificial neural network configured to receive an input, compress the input, and decompress the compressed input to generate an output such that the generated output is similar to the received input. Alternatively stated, the neural network 110 is used to reduce the size of input data into a smaller representation, and whenever original data is needed, it can be reconstructed from the compressed data.

In one aspect, the disclosed embodiments include a training phase and an operational phase. In the training phase, the neural network 110 is trained, using training data, to enable the neural network 110 to perform specific intended functions in the operational phase. The processor 106 is configured to execute an unsupervised or a semi-supervised training of the neural network 110 using training data. In the unsupervised training of the neural network 110, unlabeled training data is used for training of the neural network 106. Moreover, in the semi-supervised training of the neural network 110, a comparatively small amount of labeled training data and a large amount of unlabeled training data is used for training of the neural network 110.

Referring also to FIG. 1, the memory 108 may comprise suitable logic, circuitry, interfaces, and/or code that may be configured to store instructions executable by the processor 106. The memory 108 is further configured to store the data as is generally described herein. The memory 108 may be further configured to store operating systems and associated applications of the apparatus 100 including the neural network 110. Examples of implementation of the memory 108 may include, but are not limited to, Random Access Memory (RAM), Read Only Memory (ROM), Hard Disk Drive (HDD), Flash memory, and/or a Secure Digital (SD) card. A non-transitory computer readable storage medium may include, but is not limited to, an electronic storage device, a magnetic storage device, an optical storage device, an electromagnetic storage device, a semiconductor storage device, or any suitable combination of the foregoing.

The aspects of the disclosed embodiments separate the stent layer and non-stent layer using neural network without online optimization. The stent motion and non-stent motion does not need to be estimated on-line in an explicit way. A mapping function f maps the inputs, the sequence images and marker coordinates, into two single image outputs. The function f is fully realized via a neural network. Thus, the method disclosed herein is faster than conventional optimization-based approaches. In addition, the network is trained on a large number of data and is much robust than non-learning based methods.

Various embodiments and variants disclosed above, with respect to the aforementioned apparatus 100, apply mutatis mutandis to the method. The method described herein is computationally efficient and does not cause processing burden on the processor 102.

Modifications to embodiments of the aspects of the disclosed embodiments described in the foregoing are possible without departing from the scope of the aspects of the disclosed embodiments as defined by the accompanying claims. Expressions such as "including", "comprising", "incorporating", "have", "is" used to describe and claim the aspects of the disclosed embodiments are intended to be construed in a non-exclusive manner, namely allowing for items, components or elements not explicitly described also to be present. Reference to the singular is also to be construed to relate to the plural.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for stent visualization, the apparatus comprising a hardware processor that is configured to:
   transform a first stent image to an image space using a first spatial transformer network (STN0) to generate a first transformed stent image;
   generate a new background image from the first transformed stent image;
   transform the new background image to a background image space using a second spatial transformer network (STN1) to generate a non-stent background image ($B^k$);
   transform the non-stent background image ($B^k$) to the image space using the second spatial transformer network (STN1);
   generate a stent image in the image space from the transformed non-stent background image; and
   transform the stent image in the image space to a stent image space to generate a clear stent image ($S^k$) for the stent visualization.

2. The apparatus according to claim 1, wherein the first stent image is an image from a sequence of image frames and the hardware processor is further configured to generate the clear stent image ($S^k$) based on image frames in the sequence of image frames.

3. The apparatus according to claim 2, wherein the hardware processor is further configured to:
   use an average layer to generate the non-stent background image ($B^k$) based on the transformed new background image from the second spatial transformer network (STN1) for the image frames in the sequence of image frames; and
   use the average layer to generate the clear stent image ($S^k$) based on the transformed stent image from the first spatial transformer network (STN0) for the image frames in the sequence of image frames.

4. The apparatus according to claim 1, wherein the hardware processor is further configured to generate the first transformed stent image using balloon marker positions as inputs to the first spatial transformer network (STN0).

5. The apparatus according to claim 1, wherein the hardware processor is further configured to use a minus operation to generate the new background image from the first transformed stent image, wherein an input to the minus operation is a corresponding image from an image sequence.

6. The apparatus according to claim 1, wherein a separated background image is used as an input to the second spatial transformer network (STN1) to transform the new background image to the background image space.

7. The apparatus according to claim 1, wherein a corresponding image from an image sequence is used as an input to the second spatial transformer network (STN1) to transform the non-stent background image ($B^k$) to the image space.

8. The apparatus according to claim 1, wherein the hardware processor is configured to use a minus operation to generate the stent image in the image space from the transformed non-stent background image, wherein an input to the minus operation is a corresponding image from an image sequence.

9. The apparatus according to claim 1, wherein the hardware processor is further configured to generate the clear stent image ($S^k$) using balloon marker positions as inputs to the first spatial transformer network (STN0).

10. The apparatus according to claim 1, wherein the first spatial transformer network (STN0) and the second spatial transformer network (STN1) form a cascaded spatial transformer network.

11. A computer implemented method, comprising:
transforming a first stent image of a sequence of image frames to an image space of the sequence of image frames using a first spatial transformer network (STN0) to generate a first transformed stent image;
generating a new background image from the first transformed stent image;
transforming the new background image to a background image space using a second spatial transformer network (STN1) to generate a non-stent background image ($B^k$);
transforming the non-stent background image ($B^k$) to the image space of the sequence of image frames using the second spatial transformer network (STN1);
generating a stent image in the image space of the sequence of image frames from the transformed non-stent background image; and
transforming the stent image in the image space to a stent image space to generate a clear stent image ($S^k$).

12. The computer implemented method according to claim 11, wherein the method further comprises:
using an average layer to generate the non-stent background image ($B^k$) based on the transformed new background image from the second spatial transformer network (STN1) for image frames in the sequence of image frames; and
using the average layer to generate the clear stent image ($S^k$) based on the transformed stent image from the first spatial transformer network (STN0) for the image frames in the sequence of image frames.

13. The computer implemented method according to claim 11, wherein the method further comprises generating the first transformed stent image using balloon marker positions as inputs to the first spatial transformer network (STN0).

14. The computer implemented method according to claim 11, wherein the method further comprises using a minus operation to generate the new background image from the first transformed stent image, wherein an input to the minus operation is a corresponding image from an image sequence.

15. The computer implemented method according to claim 11, wherein the method further comprises using a separated background image an input to the second spatial transformer network (STN1) to transform the new background image to the background image space.

16. The computer implemented method according to claim 11, wherein the method further comprises using a corresponding image from an image sequence as an input to the second spatial transformer network (STN1) to transform the non-stent background image ($B^k$) to the image space.

17. The computer implemented method according to claim 11, wherein the method further comprises using a minus operation to generate the stent image in the image space from the transformed non-stent background image, wherein an input to the minus operation is a corresponding image from an image sequence.

18. The computer implemented method according to claim 11, wherein the method further comprises generating the clear stent image ($S^k$) using balloon marker positions as inputs to the first spatial transformer network (STN0).

19. The computer implemented method according to claim 18, wherein the method further comprises generating the non-stent background image ($B^k$) using the balloon marker positions as inputs to the second spatial transformer network (STN1), wherein an order of the balloon marker positions as inputs to the second spatial transformer network (STN1) is reversed relative to an order of the balloon marker positions as inputs to the first spatial transformer network (STN0).

20. A computer program product comprising a non-transitory computer-readable medium having stored thereon machine readable instructions, which when executed by a computer cause the computer to execute the method according to claim 11.

* * * * *